US012798151B2

(12) United States Patent
Sun et al.

(10) Patent No.: US 12,798,151 B2
(45) Date of Patent: Nov. 17, 2026

(54) ASSEMBLY-TYPE BUILDING BLOCK PROCESSING DEVICE

(71) Applicant: ZHE JIANG GUANGSHA VOCATIONAL AND TECHNICAL UNIVERSITY OF CONSTRUCTION, Dongyang (CN)

(72) Inventors: Qingmei Sun, Dongyang (CN); Mengfei Wang, Dongyang (CN)

( * ) Notice: Subject to any disclaimer, the term of this patent is extended or adjusted under 35 U.S.C. 154(b) by 530 days.

(21) Appl. No.: 18/434,381

(22) Filed: Feb. 6, 2024

(65) Prior Publication Data

US 2025/0229455 A1 Jul. 17, 2025

(30) Foreign Application Priority Data

Jan. 16, 2024 (CN) ......................... 202410056865.3

(51) Int. Cl.
*B28B 15/00* (2006.01)
*E04B 2/02* (2006.01)

(52) U.S. Cl.
CPC ................ *B28B 15/00* (2013.01); *E04B 2/02* (2013.01); *E04B 2002/0289* (2013.01)

(58) Field of Classification Search
CPC ... B28B 15/00; E04B 2/02; E04B 2002/0289; E04G 21/147
USPC ........................................................... 52/90.1
See application file for complete search history.

(56) References Cited

U.S. PATENT DOCUMENTS 2,721,645 A * 10/1955 Eberle .................... B65G 13/12 198/530
3,518,137 A * 6/1970 Hamilton .......... B32B 17/10908 156/391
3,928,114 A * 12/1975 Aylon ..................... E04G 21/20 156/566
4,099,607 A * 7/1978 Brennan ................... H01J 9/48 198/586
4,470,858 A * 9/1984 McMaster ................. B32B 7/12 156/275.5

* cited by examiner

*Primary Examiner* — James J Buckle, Jr.
(74) *Attorney, Agent, or Firm* — Daniel M. Cohn; Howard M. Cohn

(57) ABSTRACT

The application provides a fabricated building block processing device. In order to solve the problem that the single-layer integrated thermal insulation layer is easy to be gnawed and hollowed out by rats, and the clamping block of the clamping scheme is easy to break, the application adopts the filling block channel and the filling plate channel on the limiting shell to form the limiting channel of the multi-area double-layer thermal insulation layer structure, which is aligned with the second block body. After the filling block and the filling plate are sent into the limiting channel, the filling block and the filling plate are directly pushed into the second block body on the assembly line through the upper and lower double-layer first and second conveyor belts, and finally the filling block and the filling plate exposed outside the second block body are cut off to form a complete prefabricated building block.

10 Claims, 5 Drawing Sheets

ASSEMBLY-TYPE BUILDING BLOCK PROCESSING DEVICE

TECHNICAL FIELD

The present application relates to the technical field of fabricated building block processing, in particular to a fabricated building block processing device.

BACKGROUND

In order to strengthen heat preservation, the existing prefabricated building block can add heat preservation layer on the inner wall surface or the outer wall surface, but the outer layer heat preservation is easy to fall off and damage, and the inner layer heat preservation is easy to cause fire. To solve the above problems, the improvement scheme is to place the heat preservation layer inside the block, as shown in FIG. 1. In the prior art, a filling structure 3 is arranged between two first block bodies 1, and the filling structure 3 and the first block body 1 are fixed by clamping, for example, a trapezoidal clamping block 2 is fixed on the first block body 1, and a clamping groove matched with the trapezoidal clamping block 2 is arranged on the filling structure 3. The prefabricated building block has the advantages that it can play the role of heat preservation and noise reduction, and at the same time, it can reduce the damage factors of the filling structure 3, and the left and right ends of the filling structure 3 are flush with the first block body 1, thus having excellent heat preservation and noise reduction performance. However, due to the processing technology and raw materials of the block, the trapezoidal clamping block 2 is easy to break in the process of production and transportation, and after the outer layer of the first block body 1 is bitten by rats, the internal large-area integrated filling structure 3 is also easy to be bitten by rats, resulting in a large-area hollowing out of the stacked block.

SUMMARY

The present disclosure aims to provide a prefabricated building block processing device, aiming at eliminating a snap-in structure which is easy to break, reducing the volume of a filling structure which is gnawed by rats and ensuring the performance of noise reduction and heat preservation.

In an aspect, the present disclosure provides a prefabricated building block processing device comprises a limit shell; the limiting shell is provided with at least two filling block passages arrayed along the front and back directions, the limiting shell is provided with a filling plate passage above the filling block passage, the lower part of the limiting shell is provided with a first frame fixed with itself, the left and right sides of the first frame are rotationally connected with a shaft, the lower end of the limiting shell is provided with a first opening which conducts with the filling block passage, and the upper end of the limiting shell is provided with a second opening which conducts with the filling plate passage.

Each of the first openings is provided with a transport assembly, which comprises two first rollers, a first conveyor belt sleeved on the two first rollers, an upper end face of the first conveyor belt not lower than the first opening; Two first rollers in any transport assembly are fixedly connected on two shafts respectively; The first frame is fixedly connected with a first motor for driving one of the shafts to rotate.

The left and right sides of the upper end of the limiting shell are respectively provided with a second roller, the front and back ends of the second roller are fixedly connected with a first roller seat, the first roller seat is fixedly connected with the upper end of the limiting shell, the two second rollers are sleeved with a second conveyor belt, and the limiting shell is fixedly connected with a second motor for driving one of the second rollers to rotate; The lower end face of the second conveyor belt is not higher than the second opening.

The outer peripheral surface of the first conveyor belt or/and the second conveyor belt is provided with a conveyor structure for anti-skid.

The left side of the limiting shell is provided with a second frame, the upper end of the second frame is fixedly connected with a towing table, the towing table is provided with a third opening, the second frame is provided with a lifting mechanism, the third opening is provided with a cutter, the lifting mechanism is used for driving the cutter to lift, and the left side of the towing table is provided with a belt conveyor.

The lifting mechanism comprises two lead screws which are rotationally connected on the second frame, a fourth motor which drives one of the lead screws to rotate, and the two lead screws are synchronously driven and connected through a first pulley belt assembly.

Two second rollers are connected synchronously through a second pulley belt assembly, a second roller seat is fixedly connected on the limiting shell, a third roller located at the upper left of the filling plate channel is rotationally connected on the second roller seat, the third roller and the second roller located at the left side are connected synchronously through the third pulley belt assembly, a conveying hopper is arranged above the left side of the limiting shell, the conveying hopper is fixedly connected on the limiting shell, or the conveying hopper is fixedly connected on the supporting structure, the lower end of the conveying hopper is provided with a discharging port, the discharging port is located above the third roller, and the inside of the conveying hopper is provided with a first chamber on the left side and a second chamber on the right side.

The outer circumferential surface of the third roller is evenly distributed with a plurality of arc grooves in the circumferential direction, and the arc grooves extend along the axis direction of the third roller.

The back end of the third roller is provided with a groove, the limiting shell is fixedly connected with a connecting seat, the connecting seat is fixedly connected with a first heating element in the groove, the conveyor hopper is fixedly connected with a second heating element in the second chamber, the upper end of the conveyor hopper is fixedly connected with a cover body, a second conveyor belt, the conveyor hopper and the cover body to form a complete bucket structure, and the upper end of the cover body 59 is provided with a channel communicating with the first chamber and a channel communicating with the second chamber.

The first heating element and the second heating element are electric heating elements.

The conveying hopper is rotationally connected with a dial plate in the first chamber. When the dial plate is horizontal, the first chamber can be divided into an upper chamber and a lower chamber. The outer wall of the conveying hopper is fixedly connected with a third motor for driving the dial plate to rotate.

The right end of the conveying hopper is fixedly connected with two guide rods, the right end of the conveying hopper is provided with a third opening, the guide rods are sleeved with compression springs, the right end of the guide rods is fixedly connected with a limited position part, the right end of the compression springs is against the limited position part, the second chamber is provided with a material plate separating itself into an upper and lower four chambers, the material plates are inclined plates, horizontal plates and vertical plates which are left low and right high in turn from left to right, the horizontal plates are slid and connected in the third opening, the lower end of the horizontal plates is fixedly connected with friction parts, the friction parts and the second conveyor belt are frictionally driven, the vertical plates are slid and connected with the two guide rods, and the left end of the compression springs is against the vertical plates.

The prefabricated building block processing device of the present has the beneficial effects that:

By simultaneously feeding the uncut filling block and the uncut filling plate into the second block body, a multi-area thermal insulation layer is formed, and by adding an independent area of the thermal insulation layer, the thermal insulation and noise reduction layer can be avoided from being hollowed out in a large area after being entered by rats into one of the areas. On the other hand, through double-layer insulation, the adhesive layer ensures the ability of insulation and noise reduction.

BRIEF DESCRIPTION OF DRAWINGS

In order to explain the technical solutions in the embodiments of the present disclosure or the prior art more clearly, the drawings used by the description of the embodiments or the prior art will be briefly introduced below. Obviously, the drawings in the following description may be merely some embodiments of the present disclosure. For those of ordinary skilled in the art, other drawings may be obtained according to the structures shown in the drawings without creative effort.

Figure 1:
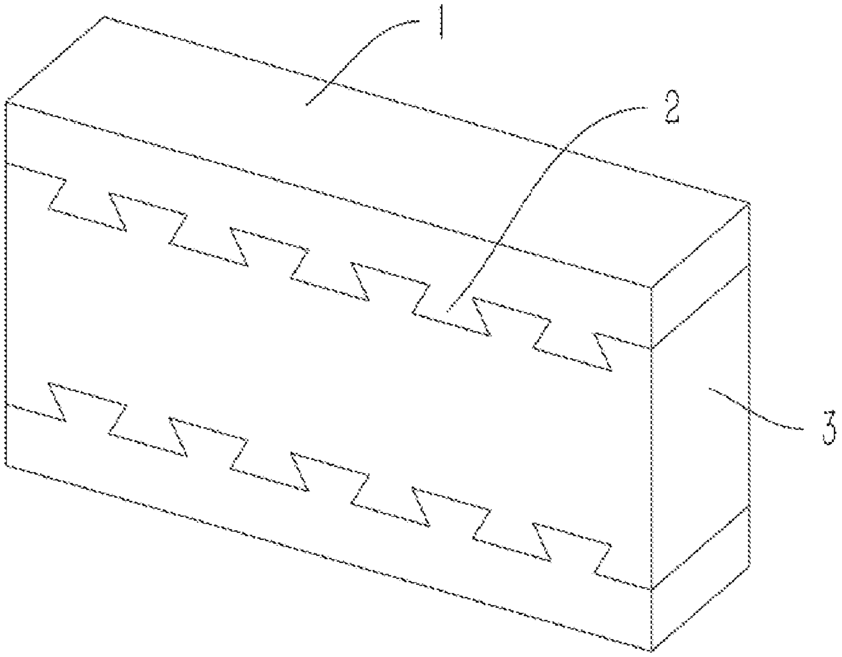
FIG. 1 is a schematic diagram of a prior art prefabricated building block structure.

In the FIG. 1. The first block body; 2, trapezoidal clamping block; 3. Filling structure; 4, a second block body; 5, filling block; 6. Filling plate; 7. Belt conveyor; 11. Limit shell; 12, filling the block channel; 13. Fill the plate channel; 21. A first rack; 22. Axis; 23. A first roller; 24. A first conveyor belt; 31. A second roller; 32. A first roller seat; 33. A second conveyor belt; 34. A second motor; 41. A second roller seat; 42. A third roller; 43. Arc groove; 44, a connecting seat; 45. A first heating element; 51. Hopper; 52. Dial plate; 53. A third motor; 54. A second heating element; 55. Guide rod; 56. Compression spring; 57. Material plate; 58. Friction piece; 61. A second rack; 62. Towing platform; 63. Lead screw; 64. Cutter; 65. Fourth motor.

The realization of the purpose, functional features and advantages of the present application will be further described with reference to the accompanying drawings in conjunction with the embodiments.

DETAILED DESCRIPTION

In the following, the technical solutions in the embodiments of the present disclosure will be clearly and completely described with reference to the drawings in the embodiments of the present disclosure. Obviously, the described embodiments may be only a part of the embodiments of the present disclosure, but not all of the embodiments. Based on the embodiments of the present disclosure, all other embodiments obtained by those of ordinary skilled in the art without creative effort shall fall within the protection scope of the present disclosure.

Figure 2:
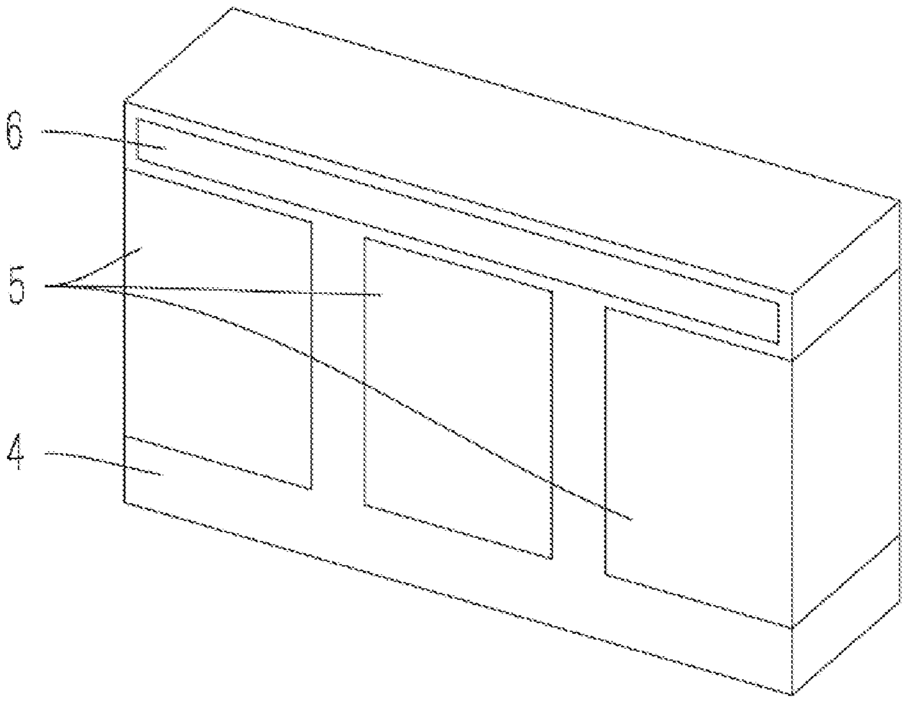
FIG. 2 is a structural schematic diagram of the prefabricated building block processed by the prefabricated building block processing device of the present.

A prefabricated building block processing device, Refer to FIG. 2 for the processed prefabricated building blocks, Comprises a second block body 4, In the FIG. 2, the upper wall body of the second block body 4 serves as the outer wall surface of the wall, The lower end wall body of the second block body 4 serves as the inner wall surface of the wall, and the upper end wall body and the lower end wall body are fixedly connected through the middle wall body, i.e. the upper and lower ends of the middle wall body are integrally connected with the upper end wall body and the lower end wall body respectively, wherein the number of the middle wall body is at least one, so that at least two notches with equal volume are formed between the upper end wall body and the lower end wall, preferably, the number of the middle wall body is two, thus forming three notches with equal volume. Each of the notches with equal volume is embedded with a filling block 5, the middle of the upper end wall body is hollowed out to form a cuboid notch, and the filling plate 6 is embedded inside, thus forming a double-layer heat preservation and noise reduction structure The thickness of the outer filling plate 6 is much smaller than that of the filling block 5, and the thickness ratio is preferably 1:3 to 1:10. At the same time, the filling block 5 and the filling plate 6 are located in more areas, which can avoid hollowing out the heat preservation and noise reduction layer in a large area after rats enter one of the areas.

Figure 3:
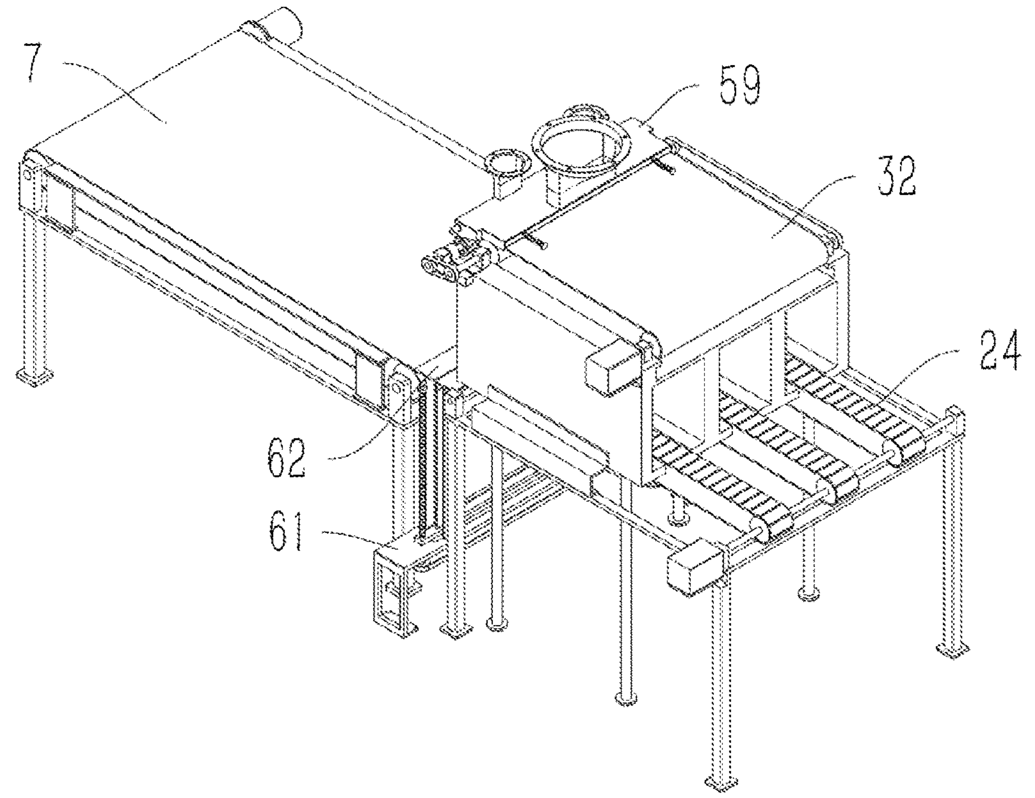
FIG. 3 is a schematic diagram of the overall structure of the present.
Figure 4:
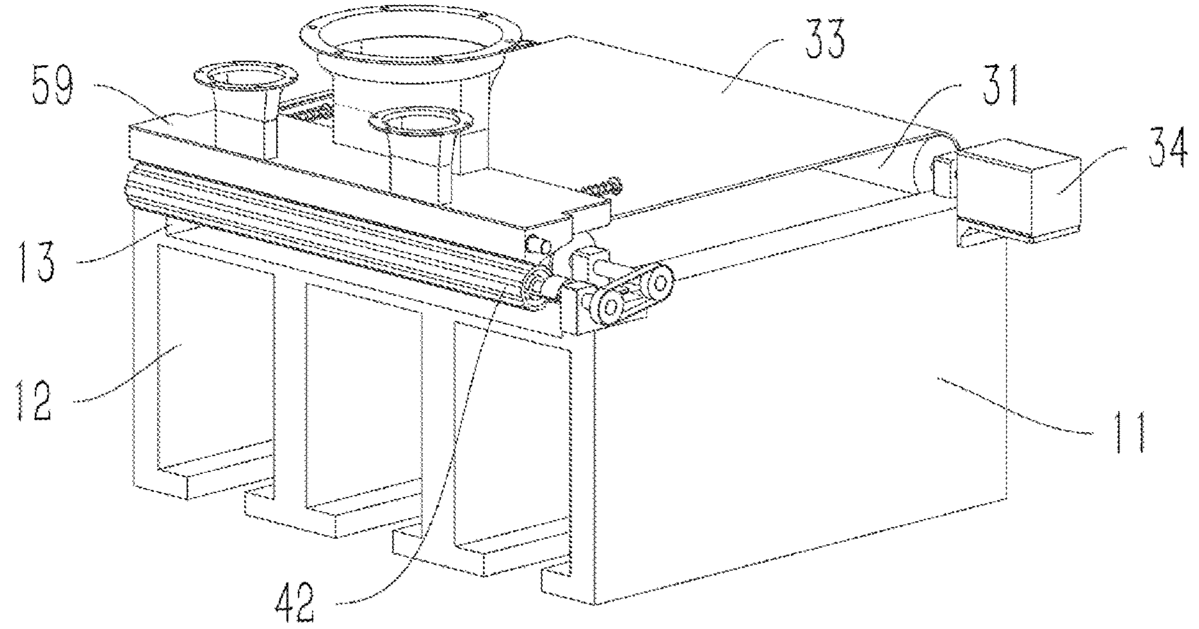
FIG. 4 is a structural schematic diagram of the limit housing, the filling block channel, the filling plate channel, the second roller, the second conveyor belt and the second motor.

Referring to FIG. 3 and FIG. 4, the fabricated building block processing apparatus comprises a limit housing 11 provided with filling block passages 12 having the same number and corresponding positions as the mentioned equal volume notches, and a filling plate passage 13 positioned above the filling block passage 12, wherein each filling block passage 12 is for placing an uncut filling block 5 inserted into the filling block passage 12 from right to left, and the uncut filling plate 6 inserted into the filling plate passage 13 from right to left, when the second block body 4 is aligned with the left end of the limit housing 11, alignment means that a plurality of equal volume notches are aligned with all the filling block passages 12, the cuboid notches are aligned with the filling plate passage 13, and the uncut filling block 5 and the uncut filling plate 6 penetrate from the left side of the limit housing 11 When out, and just can be inserted into the second block body 4.

Figure 5:
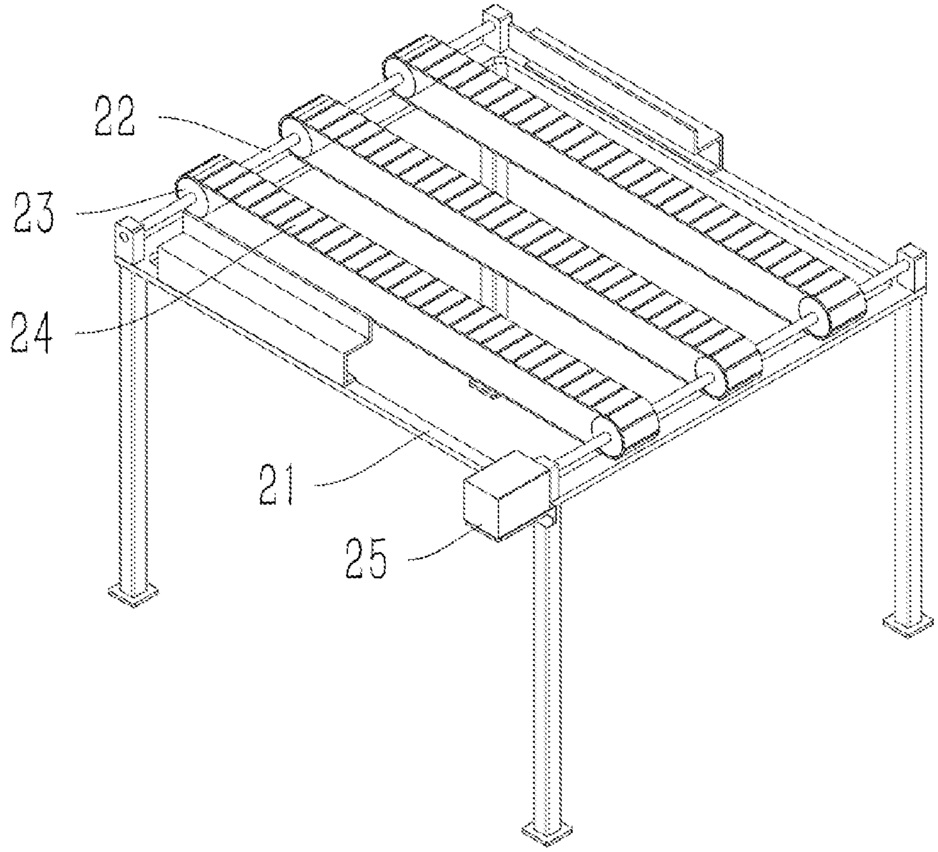
FIG. 5 is a structural schematic diagram of a first frame, a shaft, a first roller and a first conveyor belt.
Figure 6:
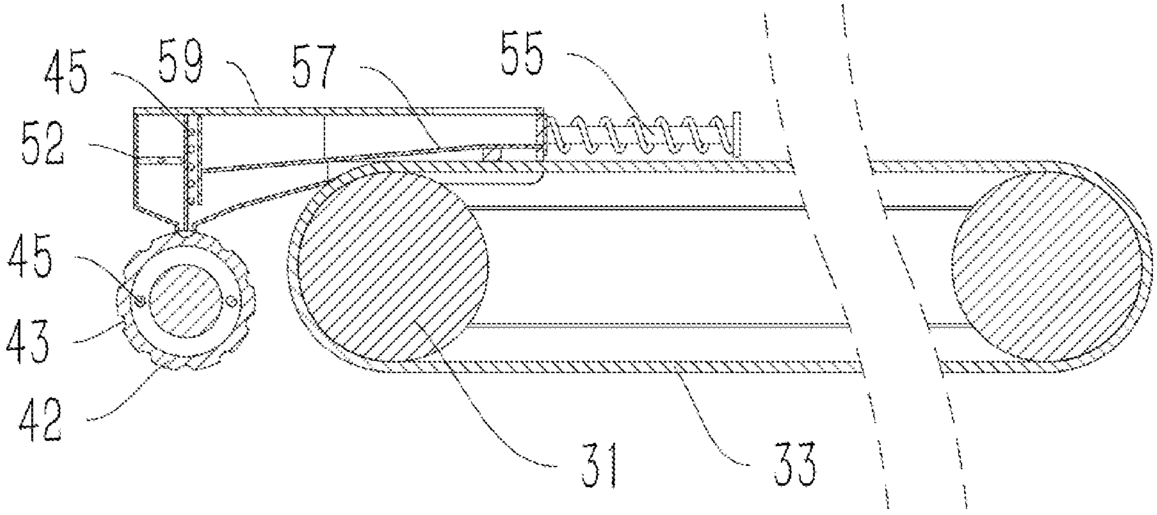
FIG. 6 is a schematic diagram of the position relationship between the discharge port and the third roller and the internal structure of the hopper.

Further, referring to FIG. 5, a first frame 21 is arranged below the limit housing 11, and the limit housing 11 is fixedly connected to the first frame 21. Preferably, the bottom of the limit housing 11 is supported by a supporting structure, such as a rod structure. The left and right sides of the first frame 21 are rotationally connected with a shaft 22, the shaft 22 extends in the front and back direction, and the two shafts 22 are horizontal. The lower end of the limit housing 11 is provided with a first opening that conducts with the filling block channel 12, and the upper end of the limit housing 11 is provided with a second opening that conducts with the filling plate channel 13.

Each of the first openings is provided with a transport assembly comprising two first rollers 23, a first conveyor belt 24 sleeved on the two first rollers 23, the upper end face of the first conveyor belt 24 not lower than the first opening; Two first rollers 23 in either transport assembly are respectively fixedly attached to two shafts 22; A first motor 25 is fixedly connected to the first frame 21, and the output shaft of the first motor 25 is fixedly connected to the rear end of the shaft 22 on the rear side; Not shown in the FIG. 5, the front ends of the two shafts 22 are connected synchronously by a pulley belt assembly, i.e., one pulley is fixed to the front ends of the two shafts 22, and the two pulleys are sleeved with synchronous belts to realize the synchronous transmission connection of the two pulleys.

When the first motor 25 is started, the first motor 25 drives the shaft 22 to rotate about the axis of its own output shaft, the shaft 22 drives the first roller 23 to rotate, and the first roller 23 drives the first conveyor belt 24 to rotate counterclockwise to drag the uncut filling block 5 to move to the left.

In order to transport the uncut filling plate 6, a second roller 31 is arranged on the left and right sides of the upper end of the limit shell 11, a first roller seat 32 is fixedly connected to the front and back ends of the second roller 32, the first roller seat 32 is fixedly connected to the upper end of the limit shell 11, a second conveyor belt 33 is sleeved on the two second rollers 31, a second motor 34 is fixedly connected to the limit shell 11, and the output shaft of the second motor 34 is fixedly connected to the rear end of the second roller 32 located on the right side; The lower end face of the second conveyor belt 33 is not higher than the second opening. When the second motor 34 is started to drive the second roller 32 located on the right side to rotate clockwise, the second roller 32 drives the second conveyor belt 33 to run clockwise, the second conveyor belt 33 contacts the upper end face of the uncut filling plate 6, and the second conveyor belt 33 uses friction to drive the uncut filling plate 6 to move to the left.

The stopper case 11 is made of metal, and the inner wall surface of the stopper case 11 is polished. On the other hand, the outer peripheral surfaces of the first conveyor belt 24 and/or the second conveyor belt 33 are provided with protruding structures for anti-skid.

By moving the uncut filling block 5 and the uncut filling plate 6 to the left and inserting them into the second block body 4, the uncut filling block 5 and the uncut filling plate 6 are cut from the right end face of the second block body 4, according to the following scheme:

A second frame 61 is arranged on the left side of the limiting housing 11, an upper end of the second frame 61 is fixedly connected with a towing table 62, a belt conveyor 7 is arranged on the left side of the towing table 62, a third opening is arranged on the towing table 62, a lifting mechanism is installed on the second frame 61, and the lowering mechanism includes two lead screws 63 which are rotationally connected to the second frame 61, the threads of the two lead screws 63 are rotated in the same direction, the lower end of the lead screws 63 on the front side is fixedly connected with the output shaft of the fourth motor 65, and the lower sides of the two lead screws 63 are connected synchronously through a first pulley belt assembly, A cutter 64 is arranged in the third opening, and the bottom structure of the cutter 64 extends in the forward and backward directions respectively. The front and rear ends of the bottom of the cutter 64 are spirally driven on two lead screws 63 respectively. Starting the fourth motor 65 can drive the two lead screws 63 to rotate synchronously, so that the lead screws 63 can drive the cutter 64 to rise and fall;

When working, the upper end face of the belt conveyor 7 coincides with the upper end face of the towing table 62, and the second block body 4 can be transported on the belt conveyor 7 and the towing table 62 in the conventional way of assembly line transportation, such as conveying by other conveyors, pushing by electric push rod or grasping by mechanical arm. The bottom right side of the second block body 4 is placed on the upper end of the towing table 62, and the bottom left side of the second block body 4 is placed on the conveying belt of the belt conveyor 7. The cutter 64 is against the right end of the second block body 4 and the cutter 64 is not higher than the lower end wall of the second block body 4. The conveyor belt of the belt conveyor 7 rotates counterclockwise, so that the second block body 4 has a tendency to move to the right After the filling plate 6 is inserted into the notch of equal volume and the rectangular notch, respectively, the cutter 64 is raised to cut the uncut filling block 5 and the uncut filling plate 6 in turn from bottom to top.

Figure 7:
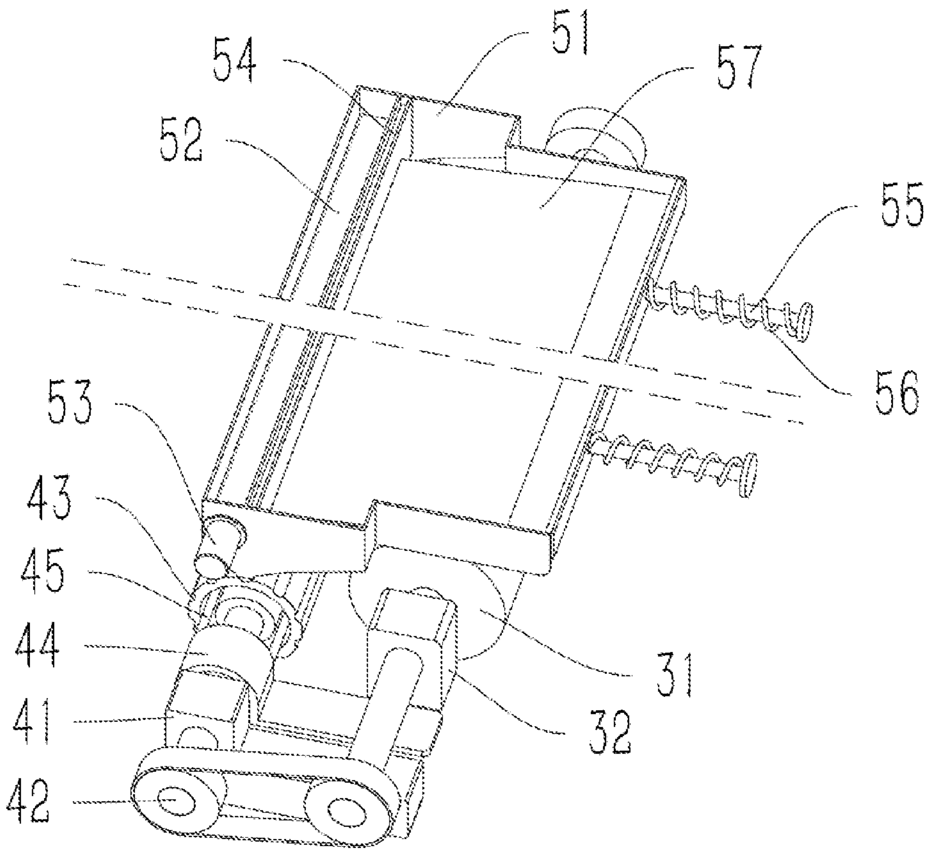
FIG. 7 is a schematic diagram of the transmission relationship between the second roller and the third roller.
Figure 8:
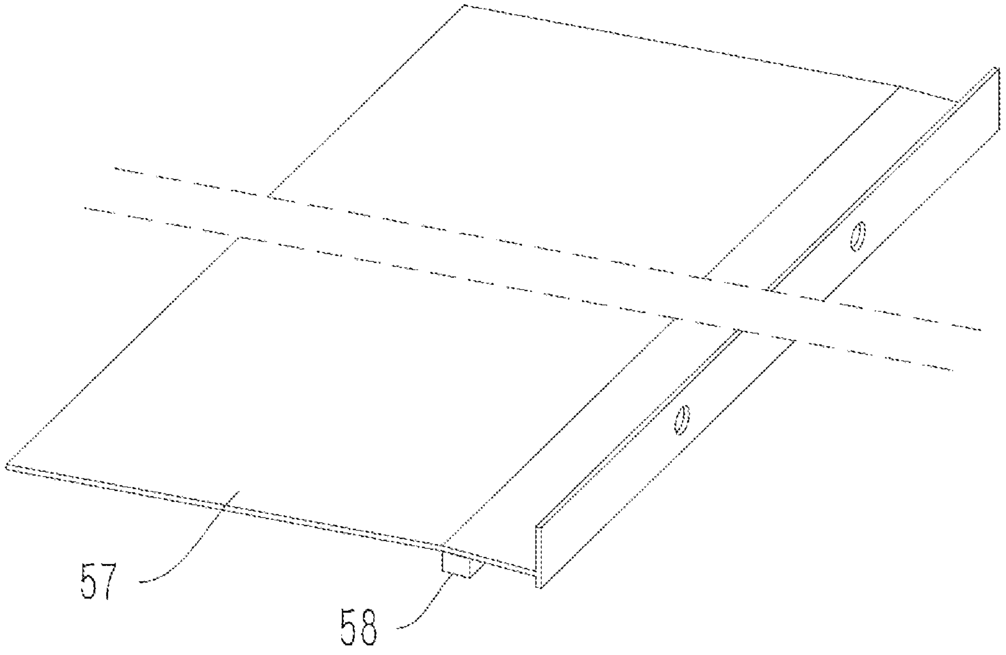
FIG. 8 is a structural schematic diagram of the material plate and the friction piece.
Figure 9:
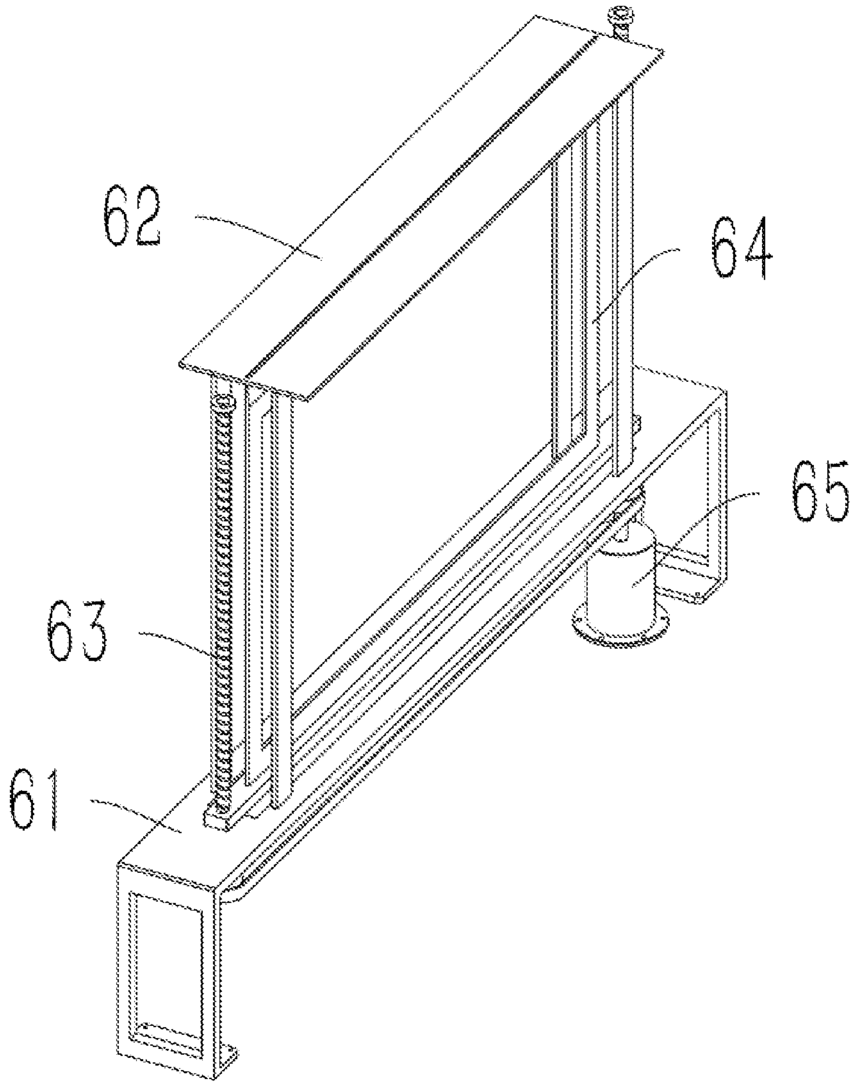
FIG. 9 is a structural schematic diagram of the second frame, towing table, lead screw, cutter and the fourth motor.

As further explained, In order to improve the ability of preventing rat bite, the following scheme is adopted: combining with FIG. 7 and FIG. 8, the front end of the two second rollers 31 is connected synchronously, the second roller seat 41 is fixedly connected to the limit housing 11, the third roller 42 is rotationally connected to the second roller 42 located at the upper left of the filling plate channel 13, the rear end of the third roller 42 is connected synchronously with the rear end of the second roller 31 located at the left side through the third pulley belt assembly, the upper left side of the limit housing 11 is provided with a hopper 51, which is fixedly connected to the limit housing 11, or the hopper 51 is fixedly connected to a supporting structure, which can be a steel frame fixed on the ground The maximum distance is preferably 1-2 mm, the inside of the hopper 51 is fixedly connected with a partition structure to form a first chamber located on the left side and a second chamber located on the right side, and the first chamber is smaller than the second chamber. A plurality of arc grooves 43 are uniformly distributed in the circumferential direction of the outer circumferential surface of the third roller 42, and the arc grooves 43 extend along the axial direction of the third roller 42.

The second roller 31 which rotates clockwise can drive the third roller 42 to rotate clockwise. When the third roller 42 rotates, any arc groove 43 can face the lower part of the discharge port, and the bottom of the third roller 42 can contact the uncut filling plate 6 which moves to the left. The first chamber is used for injecting hot melt adhesive or liquid adhesive at normal temperature and its viscosity is reduced after heating, and the second chamber is used for feeding metal powder or plant powder; Among them, the plant powder can be elderberry powder or lavender powder; The powder at the discharge port first falls on the third roller 42, and the arc groove 43 can increase the powder dose received at the top of the third roller 42, then the liquid viscous adhesive agent flows out and covers the powder and the third roller 42, and finally the mixed adhesive agent and powder agent are coated on the upper end face of the uncut filling plate 6 by the rotation of the third roller 42, and the upper end face is in the direction of the outer wall face of the stacked block, so as to reduce the invasion of rats.

The rear end of the third roller 42 is provided with a groove, the limiting shell 11 is fixedly connected with a connecting seat 44, the connecting seat 44 is fixedly connected with a first heating member 45 located in the groove, the second heating member 54 located in the second chamber is fixedly connected with a plate member located in the second chamber, the upper end of the conveying hopper 51 is fixedly connected with a cover 59, a second conveyor belt 33, the conveying hopper 51 and the cover 59 form a complete bucket structure, so as to improve the internal heat preservation ability and avoid dust flying. The upper end of the cover 59 is provided with a channel communicated with the first chamber for injecting hot melt adhesive, and the upper end of the cover 59 is provided with a channel communicated with the second chamber for conveying powder.

The first heating element 45 and the second heating element 54 are electric heating elements.

A dialing plate 52 located in the first chamber is rotationally connected in the conveying hopper 51. When the dialing plate 52 is horizontal, the first chamber can be divided into an upper and lower third chamber. A third motor 53 for driving the dialing plate 52 to rotate is fixedly connected on the outer wall of the conveying hopper 51. The output shaft of the third motor 53 is fixedly connected with the rear end of the dialing plate 52. The dialing plate 52 can agitate and push glue once to control the regular discharge of glue and control the timing of discharging glue. The dialing plate 52 can keep injecting glue into the first chamber in a low pressure state. The dialing plate 52 is horizontal to seal the first chamber so as to block the discharge of glue. The side of discharging glue through the discharge port is narrow, such as 1-3 mm.

As further explained, The right end of the hopper 51 is fixedly connected with two horizontal guide rods 55 extending to the right, The right end of the hopper 51 is provided with a third opening, A compression spring 56 is sleeved on the guide rod 55, The right end of the guide rod 55 is fixedly connected with a finite position part, The right end of the compression spring 56 abuts against the limiting portion, The second chamber is provided with a material plate 57 which separates itself from an upper and lower fourth chamber, The material plate 57 has an integrated structure, From left to right, there are inclined plates, horizontal plates and vertical plates with low left and high right. The horizontal plate is sliding connected in the third opening, The lower end of the horizontal plate is fixedly connected with a friction member 58, The friction member 58 is frictionally driven with the second conveyor belt 33, When the second conveyor belt 33 rotates clockwise, it also shifts the friction member 58 to move to the right so that the horizontal plate moves to the right. The left end of the material plate 57 changes from the state of keeping contact with the partition structure inside the hopper 51 to the separation structure, so that the powder on the material plate 57 can fall to the discharge port. Because the pressure spring will be further compressed, the elastic force will increase, and the second conveyor belt 33 and the friction member 58 will start to slip, so that the material plate 57 will move to the left and reset. With the elongation of the pressure spring, the elastic force will decrease, and the material plate 57 will be affected by the friction force to move to the right again, realizing the repeated left-right shaking of the material plate 57 to avoid the blockage of the powder. At the same time, When the second conveyor belt 33 stops running, the plate 57 resets and closes the upper half area of the second chamber, so that the powder discharged from the passage communicating with the upper half area of the second chamber cannot be continuously discharged to the discharge port.

The above descriptions are only optional embodiments of the application, and do not limit the scope of the patents of the present application. All the equivalent structural transformations made by the content of the specification and drawings of the present application under the creative concept of the present application, or directly/indirectly used in other related technical fields are all included in the protection scope of the patents of the present application.

What is claimed is:

1. A prefabricated building block processing device comprises: a limit shell (11); at least two filling block passages (12) arrayed in front and back directions are arranged on the limiting shell (11), a filling plate passage (13) arranged above the filling block passage (12) is arranged on the limiting shell (11), a first frame (21) fixedly connected with itself is arranged below the limiting shell (11), a shaft (22) is rotationally connected at the left and right sides of the first frame (21), a first opening which is communicated with the filling block passage (12) is arranged at a lower end of the limiting shell (11), and a second opening which is communicated with the filling plate passage (13) is arranged at a upper end of the limiting shell (11);

each of the first openings is provided with a transport assembly comprising two first rollers (23), a first conveyor belt (24) sleeved on the two first rollers (23), a upper end face of the first conveyor belt (24) not lower than the first opening; the two first rollers (23) in either transport assembly are respectively fixedly connected to two shafts (22); a first motor (25) for driving one of the shafts (22) to rotate is fixedly connected to the first frame (21); when a detection module (107) determines that a identification module (202) is in a target opening stage, the a execution module (104) is triggered to drive a gripper (103) to expand and the pressing sleeve (105) to move rightwards such that the a sealing cylinder (106) expands; the sealing cylinder (106) engages with an inner wall of a valve core (205), and the gripper (103) engages with an inner wall of a outer housing;

the left and right sides of the upper end of the limiting shell (11) are respectively provided with a second roller (31), a front and back ends of the second roller (32) are fixedly connected with a first roller seat (32), the first roller seat (32) is fixedly connected with the upper end of the limiting shell (11), the two second rollers (31) are sleeved with a second conveyor belt (33), and the limiting shell (11) is fixedly connected with a second motor (34) for driving one of the second rollers (31) to rotate; a lower end face of the second conveyor belt (33) is not higher than the second opening.

2. The fabricated building block processing device according to claim 1, wherein the outer peripheral surface of the first conveyor belt (24) or/and the second conveyor belt (33) is provided with a conveyor structure for anti-skid.

3. The prefabricated building block processing device according to claim 1, wherein the left side of the limiting shell (11) is provided with a second frame (61), the upper end of the second frame (61) is fixedly connected with a towing table (62), the towing table (62) is provided with a third opening, the second frame (61) is provided with a lifting mechanism, the third opening is provided with a cutter (64), the lifting mechanism is used for driving the cutter (64) to lift, and the left side of the towing table (62) is provided with a belt conveyor (7).

4. The fabricated building block processing device according to claim 3, wherein the lifting mechanism comprises two lead screws (63) rotationally connected to the second frame (61), a fourth motor (65) for driving one of the lead screws (63) to rotate, and the two lead screws (63) realizing synchronous transmission connection through a first pulley belt assembly.

5. The fabricated building block processing device according to claim 3, wherein two second rollers (31) are connected synchronously by means of a second pulley belt assembly, a second roller seat (41) is fixedly connected on the limiting shell (11), a third roller (42) is rotationally connected on the second roller seat (41) at the upper left of the filling plate channel (13), the third roller (42) is connected synchronously with the second roller (31) at the left side by means of the third pulley belt assembly, a conveying hopper (51) is arranged above the left side of the limiting shell (11), the conveying hopper (51) is fixedly connected to the limiting shell (11), or the conveying hopper (51) is fixedly connected to the supporting structure, the lower end of the conveying hopper (51) is provided with a discharging port (51) A first chamber located on the left side and a second chamber located on the right side are internally provided.

6. The fabricated building block processing device according to claim 5, wherein a plurality of arc grooves (43) are uniformly distributed on the outer circumferential surface of the third roller (42), and the arc grooves (43) extend along the axial direction of the third roller (42).

7. The fabricated building block processing device according to claim 5, wherein the rear end of the third roller (42) is provided with a groove, the limiting shell (11) is fixedly connected with a connecting seat (44), the connecting seat (44) is fixedly connected with a first heating element (45) located in the groove, the conveyor hopper (51) is fixedly connected with a second heating element (54) located in a second chamber, the upper end of the conveyor hopper (51) is fixedly connected with a cover body (59), a second conveyor belt (33), the conveyor hopper (51) and the cover body to form a complete bucket structure, and the upper end of the cover body is provided with a passage communicating with the first chamber and a passage communicating with the second chamber.

8. The fabricated building block processing device according to claim 7, wherein the first heating element (45) and the second heating element (54) are electric heating elements.

9. The prefabricated building block processing device according to claim 5, wherein a dialing plate (52) located in a first chamber is rotationally connected in a hopper (51), and when the dialing plate (52) is horizontal, the first chamber can be divided into an upper and lower third chamber, and a third motor (53) for driving the dialing plate (52) to rotate is fixedly connected to the outer wall of the hopper (51).

10. The prefabricated building block processing device according to claim 5, wherein the right end of the conveying hopper (51) is fixedly connected with two guide rods (55), the right end of the conveying hopper (51) is provided with a third opening, the guide rods (55) are sleeved with a compression spring (56), the right end of the guide rods (55) is fixedly connected with a limited position part, the right end of the compression spring (56) is against the limited position part, a material plate (57) separating itself into an upper and lower four chambers is arranged in the second chamber, the material plate (57) is inclined plate, horizontal plate and vertical plate which are left low and right high in turn from left to right, the horizontal plate is sliding connected in the third opening, the lower end of the horizontal plate is fixedly connected with a friction piece (58), On the guide rod (55), the left end of the compression spring (56) abuts against the vertical plate.

* * * * *